United States Patent [19]

LaPoint

[11] Patent Number: 5,262,103
[45] Date of Patent: Nov. 16, 1993

[54] COLD MOLDING PROCESS

[75] Inventor: James P. LaPoint, Rolling Hills Estates, Calif.

[73] Assignee: Versi-Corp, Huntington Beach, Calif.

[21] Appl. No.: 795,509

[22] Filed: Nov. 21, 1991

[51] Int. Cl.$^5$ .............................................. B29C 43/00
[52] U.S. Cl. ......................................... 264/69; 264/75; 264/77; 264/101; 264/122; 264/126
[58] Field of Search ........................ 264/23, 41, 73, 77, 264/101, 109, 122, 123, 83, 126, 75; 428/15, 402

[56] References Cited

U.S. PATENT DOCUMENTS

| | | | |
|---|---|---|---|
| 2,297,248 | 9/1942 | Rudolph | 264/123 |
| 2,428,771 | 10/1947 | Almy | 264/123 |
| 3,248,464 | 4/1966 | Telkes | 264/123 |
| 3,266,108 | 8/1966 | Dunning et al. | 264/123 |
| 3,709,651 | 1/1973 | Rivat-Lahousse | |
| 3,729,331 | 4/1973 | Vivian | |
| 3,829,542 | 8/1974 | De Romano | 264/71 |
| 4,000,236 | 12/1976 | Redfarn et al. | 264/112 |
| 4,108,940 | 8/1978 | Ratte et al. | |
| 4,382,757 | 5/1983 | Roy et al. | |
| 4,529,563 | 7/1985 | McGinniss | |
| 4,840,758 | 6/1989 | Thorsrud | |
| 4,923,657 | 5/1990 | Gembinski et al. | 264/73 |

FOREIGN PATENT DOCUMENTS

| | | | |
|---|---|---|---|
| 57-57635 | 4/1982 | Japan | |
| 7017968 | 6/1972 | Netherlands | 264/73 |
| 7003603 | 9/1990 | Netherlands | |

Primary Examiner—Mary Lynn Theisen
Attorney, Agent, or Firm—Knobbe, Martens, Olson & Bear

[57] ABSTRACT

Disclosed is a cold molding process for the production of a unitary article from a plurality of plastic particles. The process may be conducted without the addition of heat. A plurality of homogeneous or heterogeneous plastic particles are introduced into a mold, softened by exposure to a softening agent, and thereafter compressed to form the unitary article. Preferred softening agents comprise an organic component and an aqueous component. One preferred softening agent-plastic combination comprises aqueous methylethylketone and polystyrene.

30 Claims, No Drawings

COLD MOLDING PROCESS

FIELD OF THE INVENTION

The present invention relates to a method of forming plastic articles from powdered or particulate plastic material.

BACKGROUND OF THE INVENTION

A common way of producing molded thermoplastic articles known in the prior art is to heat thermoplastic polymers in a mold. For example, U.S. Pat. No. 4,382,757 discloses the molding of polystyrene beads in a patented apparatus through the introduction of steam into a mold. The steam heats the beads and causes them to expand and coalesce into a solid block of material.

Another method of heating thermoplastic materials to form molded plastic articles is disclosed in U.S. Pat. No. 4,840,758. This process involves mixing a radio frequency energy sensitizing agent comprised of N-ethyl toluene sulfonamide with a thermoplastic polymer. This mixture is placed in a mold and subjected to radio frequency energy for a time sufficient to heat the mixture. The mixture is then compressed to form the final molded product.

The prior art also discloses methods of compression molding a plastic article without the use of heat. In U.S. Pat. No. 4,108,940, a process for producing flexible molded articles is described. This process involves the compression of elastomers, such as carboxyl terminated polybutadiene, to produce an uncured, flexible product.

The use of organic solvents to treat thermoplastic articles in various ways is known in the prior art as well. Organic solvents have been used, for example, to reflow thermoplastic surfaces such as paint, as disclosed in U.S. Pat. No. 3,729,331. Solvents such as methylethylketone have also been used to treat polystyrene film in order to produce synthetic paper.

Notwithstanding the foregoing, there remains a need for a method of molding a plastic, such as polystyrene, to produce a relatively rigid product in a relatively short time without the necessity of heat.

SUMMARY OF THE INVENTION

The present invention relates to a method of forming molded thermoplastic articles from powdered or particulate plastic material. These particles, which preferably range from about 1/32 " to ⅜", may be placed in a mold and mixed with a softening agent composed of an organic solvent capable of dissolving the plastic particles and an inert carrier such as water in which the solvent is preferably miscible.

In one embodiment of the present invention, the particles are sprayed with a mist of the softening agent just prior to their introduction into the mold. Alternatively, the particles can be exposed to the softening agent in the mold.

The softening agent modifies the surfaces of the particles so that the particles fuse when put under pressure. Preferably, excess softening agent is drained from the particle-softening agent mixture before compression and recycled, though the mixture may be compressed without drainage if excess softening agent is allowed to escape during compression. After the material has been treated by the softening agent, it is put under pressure in the mold and compressed to form the final molded article.

Although heat may be applied to the final molded product to remove excess softening agent in accordance with one embodiment of the present invention, such heating is generally not required. The use of a vacuum before compression to remove excess softening agent may, for instance, be substituted for post-formation heating. Thus, the process of the present invention virtually eliminates one of the highest costs of forming plastic articles, namely the cost of heating the plastic polymers.

The process of the present invention may be used to form a variety of plastic articles. In one embodiment, hard polystyrene articles having a smooth exterior surface and marbled appearance may be produced. By using less pressure and/or a shorter softening time, solid plastic articles with pores may also be produced such as for use as filtration media. In a further embodiment of the present invention, vibration of the plastic particles during or previous to their compression may be effected in order to more compactly settle the particles. In addition, fillers may be used to fill interstitial spaces between the plastic particles or to give the final product color, added strength, UV resistance or other desired properties.

These and additional features and advantages of the present invention will become apparent from the Detailed Description of Preferred Embodiments which follows, when considered together with the attached claims.

DETAILED DESCRIPTION OF PREFERRED EMBODIMENTS

There is provided in accordance with one aspect of the present invention a method of forming a plastic article from powdered or particulate plastic material. The plastic particles are first introduced into a mold, preceding or following exposure to a softening agent, and thereafter compressed into the desired shape. Excess plastic softening agent is removed, and, preferably, recycled. The resulting article immediately becomes relatively rigid. This method may be utilized to produce a wide variety of construction and consumer goods.

The method may be carried out at ambient temperatures, thereby saving the cost of conventional thermoforming or heating steps. Although the method does not require the addition of heat, some applications or softening agent-plastic combinations may benefit from a heating step. If heating is used as a facilitator in the present method, relatively low temperatures will generally suffice. To retain some energy savings, heating to a temperature below the melting point, and preferably below the softening point of the plastic particulate, is preferred.

In general, the present invention contemplates the use of combinations of a plastic and a softening agent which comprises a solvent for the plastic. Specific exemplary plastics contemplated by the inventor herein include polystyrene, ABS, acrylic, polycarbonate and polyvinyl chloride. Selection of particular plastics will be governed by any of a variety of considerations, including expense, desired physical properties of the finished product, and available solvents and solvent systems. The use of combinations of plastics is also contemplated. For example, polystyrene and acrylic may be mixed together to form a plastic article using the present method.

Preferably, the plastic is obtained in a particulate form. For example, such plastic particles might range from about 1/32" screen size (powder) to about ⅜" screen size or larger. Typically, a stated particle size (e.g., 3/16") will contain a relatively minor amount (e.g., on the order of about 10%) by weight of "fines" or sand-like fine particulate. In general, a finer mesh size will produce a more homogeneous product. Larger particles, due to the relatively larger interstitial spaces between them, are believed to require greater amounts of pressure to produce a solid finished product. Thus, using a finer mesh size particle will also enable the use of relatively less pressure to produce a product having a given density.

It is believed that the surface of a particle is modified when it comes into contact with the softening agent, so that when the particles are pressed together the adjoining surfaces of the particles become fused. Relatively large particles which have been exposed to the softening agent for a relatively short period of time are thus believed to have only a relatively thin softened layer. These circumstances produce a system in which a relatively large compressive force will be required to produce a unitary solid. On the other hand, exposing plastic particles to the softening agent for a relatively longer period of time produces a deeper softening effect and requires less pressure to compress the particles into a unitary solid. Timing considerations will be discussed in greater detail infra.

Compressive pressure requirements may also be influenced by the use of blends of different particle sizes. In theory, smaller particles will tend to infiltrate the interstitial spaces between larger particles, thereby requiring a shorter softening agent exposure time and/or lower compressive pressure to produce a solid product. However, in practice some difficulty is encountered in maintaining an even distribution of particles having significantly different sizes. Therefore, relatively homogeneously sized particles are preferably used. More preferably, for solid articles such as counter tops and picture frames, particles having a 3/16" screen size are used.

For any particular plastic or plastic blend, the ideal solvent can be determined through routine experimentation. Solvents which have been found useful by the present inventor for plastics such as those identified above include methylethylketone (MEK), acetone, toluene, xylene, and styrene monomer. It has also been found that for some solvent/plastic combinations, it is advantageous to mix the appropriate organic solvent with an inert carrier liquid in which the solvent is miscible, such as water. Preferably, for use with polystyrene, an aqueous MEK mixture is utilized.

The preferred aqueous MEK mixture for use with polystyrene in accordance with the present invention can range anywhere from about 5% MEK to about 35% by volume MEK in water. As a result of the relative solubilities of water and MEK, water will hold about 28% by weight MEK, and MEK will hold about 11.8% by weight of water. The softening activity of the softening agent appears to be related to the concentration of MEK and water such that relatively high MEK content tends to result in a deeper softening effect for a given interval of time than a relatively weaker MEK content.

The role of water in the water/organic softening agent mixtures is believed by the inventors herein to slow down the softening effect of the organic component. Thus, relatively higher concentrations of the organic component up to 100% MEK can be utilized if the equipment is set up in a manner that permits compression within a relatively short period of time following introduction of the softening agent. In addition, relatively short exposure times (e.g., as a result of relatively high concentrations of the organic component in the softening agent) should not be so short as to compromise the ability to thoroughly and uniformly intermix the particles with the softening agent. Thus, the optimum aqueous/organic ratio in the softening agent should be determined for each mixing and compression apparatus set up, based upon routine experimentation. In one embodiment of the present invention, a 60% MEK/40% $H_2O$ mixture was found useful in a process having a press which closed within about 10 seconds following commencement of exposure.

In addition, the softening agent may comprise more than one organic component. For example, a softening agent such as aqueous MEK and acetone has been found to provide a useful softening agent for use with acrylic plastic. A number of softening agent systems can likely be identified through routine experimentation by one of skill in the art in view of the disclosure herein. The specific embodiments disclosed herein are therefore intended to be illustrative of the invention but not limiting.

The softening agent may be applied to the plastic particles in any of a variety of manners which will be understood to one of skill in the art. For example, in one embodiment of the invention the plastic particles are loaded into the cavity of a mold. Softening agent is thereafter introduced into the mold to immerse all of the particles. The excess softening agent may then be siphoned off of the mold, or permitted to escape from the mold upon compression. This excess softening agent may be returned to a reservoir for reuse.

Preferably, however, the softening agent and plastic particles are simultaneously introduced into the mold. This is particularly desired when the mold is relatively deep, or uniformity throughout the finished product is important. This is because introduction of softening agent into the top of the mold following introduction of the particulate results in a longer exposure time for particles at the top of the column compared to those at the bottom.

Alternatively, plastic particles may be sprayed with a mist of the softening agent either just prior to introduction into the mold or following introduction into the mold. Application by spraying may be particularly useful in continuous production systems such as extrusion molding. The particular mode of application can be optimized for a given operation by one of skill in the art.

The exposure time of the plastic particles to the softening agent before compression has also been found to affect the other process parameters. For example, a longer exposure time is believed to cause a deeper softening of the plastic particles, and permits formation of a solid article with a relatively smaller compressive force. In general, exposure times of less than about one minute and preferably in the range of from about 2-10 seconds (for 35% MEK/$H_2O$ and 3/16" polystyrene) have been found acceptable for use in the method of the present invention.

The amount of pressure required to produce the solid plastic molded article in accordance with the present invention depends upon the particle size, particle mix, percent solid desired in the finished product, solvent, percent solvent in softening agent, solvent mixture and presence of binders, as will be understood by one of skill in the art. In general, to produce a solid polystyrene product using 3/16" particle size and a 35% MEK aqueous softening agent, a pressure within the range of from about 10,000 psi to about 20,000 psi applied for about two seconds, has been found useful.

Pressures as low as about 2,500 psi will result in a unitary plastic article; however, pressures in this range may be insufficient to completely fill the interstitial spaces so that a relatively porous article will result. Accordingly, filtration media having a variety of pore sizes can be produced in accordance with the present invention. Coarse filtration media, such as may be desired for use in landfill or other coarse filtration environments, may be produced by exposing 3/16" particle size polystyrene to a softening agent for a relatively short period of time and exposing the resultant polystyrene-softening agent mixture to a pressure of approximately 2,500 pounds for 1-2 seconds.

In some applications, it may be desirable to minimize any excess or "fugitive" softening agent. This can be accomplished by including a post-forming baking step to drive off the excess softening agent. Alternatively, exposing the wetted plastic particles to a vacuum following the draining of the solvent and prior to and/or during compression may also minimize the amount of excess entrapped softening agent. Although excess MEK has not been found to present any particular difficulties in a polystyrene system, other plastic/solvent systems such as those incorporating the styrene monomer tend to produce undesirable outgassing following compression unless preventative steps are taken.

It has been determined by the inventors herein that the removal of excess MEK can be optimized at ambient temperatures by reducing the MEK boiling point under vacuum. Thus, for example, following removal from the compression mold, the solid product is air-dried for approximately an hour and then immersed in water. A vacuum is drawn in the head space over the water to approximately 29 inches of mercury. Under these conditions, MEK will boil at approximately 70° F. Depending upon the desired result, the solid article is preferably left under vacuum conditions within the range of from several hours to approximately 12 hours or longer.

A variety of additional additives or modifications to the basic process may also be desired to effect economies during manufacture or physical property changes, depending upon the desired use of the plastic article to be formed. For example, flame-retardants or ultraviolet light inhibitors may be added as desired. Structural articles which will be exposed to the sunlight may benefit from the addition of conventional UV inhibitors, although acrylic products have traditionally exhibited superior longevity under UV exposure without such inhibitors.

Vibration of the plastic particles in the ultrasonic or near ultrasonic range may also be desired either prior to, during, or instead of compression of the softened plastic particles. As will be appreciated by one of skill in the art, ultrasonic vibration will tend to settle the particles into a more compact relationship, and may result in reducing the amount of energy required to be expended on compression.

Powdered or fine particulate fillers may also desirably be added to the plastic particles in order to fill the interstitial spaces therein. Preferably, the fillers will not be soluble in the softening agent. A wide variety of suitable fillers known in the art may be used, such as mica, calk, calcium carbonate, and silica.

Other fillers may be utilized to change the strength and heat distortion temperature characteristics of the finished product. Such fillers include fiber additives such as glass fiber or graphite fiber. Fillers and fibers are generally added in relatively low weight percentages, usually no more than about 5% by weight of the unwetted plastic particles, and preferably no more than about 2% by weight of the plastic particles.

In accordance with a further aspect of the present invention, there is provided a method of manufacturing a unitary article which comprises a solidified plastic particulate material together with one or more preformed solid articles. In accordance with this aspect of the present invention, one or more preformed solid articles are introduced into a compression mold. Plastic particulate, either prior to or following exposure to a softening agent, is introduced into the mold around the preformed solid. The particulate mixture also comprises any of a variety of fillers or modifiers, as has been discussed.

The mold is thereafter subjected to compression, as has been discussed, to produce a unitary article which comprises a combination of the solidified plastic particulate material together with the preformed solid therein.

The foregoing process is useful for producing any of a wide variety of articles having multiple textures, tones, designs, etc. For example, signs can be produced by introducing preformed letters into the bottom of the mold. Following introduction of the plastic particulate and softening agent and compression steps, the resulting unitary article is removed from the mold to reveal the previously introduced lettering or numbering. Alternatively, the preformed solid can provide structural strength for other physical properties as desired. For example, bearings, connectors or hinges and the like can be introduced into the mold so that the resulting unitary article comprises a plastic body having imbedded therein a means for fastening the plastic body to something else, as will be apparent to one of skill in the art in view of the description contained herein.

In addition, designs may be produced such as for counter tops or counter top or floor tiles. For this purpose, preformed solids in the form of rods, bars or geometric shapes can be introduced into the bottom of the compression mold prior to introduction of the plastic particulate. Thus, the preformed solid can either be formed from the same plastic as the plastic particulate so that bonding will be accomplished therebetween, or can comprise a different material which may or may not be soluble in the softening agent.

In an embodiment where the preformed solid comprises the same material as the plastic particulate, the preformed solid can be produced in accordance with the same cold compression process disclosed herein, or through conventional thermal molding techniques. In the former instance, a plurality of successive particulate addition and compression steps can be utilized to produce a unitary article having a plurality of layers, which may be variously colored or treated with modifiers such as UV inhibitors or structural enhancement additives. In the production of articles to be exposed to sunlight, it may be desirable from a materials/cost standpoint for only the outermost layer of the article to be impregnated with a UV inhibitor.

Some specific applications of the foregoing invention will be demonstrated in the following examples:

EXAMPLE 1

Preparation of Polystyrene Disks

A plurality of polystyrene disks having relatively smooth exterior surfaces and a marbled appearance were produced in the following manner.

A mold having a cylindrical cavity with a diameter of approximately 2" was provided. Polystyrene particles having a mesh size of approximately ⅜ were introduced into the bottom of the mold to a height of approximately 3/4 inch. A mixture of approximately 35% by volume methylethylketone and 65% by volume water was introduced into the mold in a quantity sufficient to completely immerse the polystyrene particles. After approximately 5-10 seconds of exposure to the softening agent, a piston was introduced into the mold to compress the polystyrene particles. Compression of approximately 20,000 pounds per square inch was applied for a dwell time of no more than about 2 seconds. The diameter of the piston was slightly less than the interior diameter of the mold cavity, so that excess softening agent was permitted to escape around the piston. The piston was removed immediately, and a 2" diameter by approximately ⅜ thick rigid polystyrene disk was removed from the mold.

Visual observation of the disk revealed the appearance of discrete polystyrene particles. The surface of the disk was slightly textured. Dissection of the disk revealed that the polystyrene had solidified throughout.

EXAMPLE 2

Coloration

A plurality of polystyrene disks were prepared substantially as in Example 1. However, the particles introduced into the mold comprised a blend of colored and uncolored polystyrene particles. The resulting disk had a homogeneously distributed marbled or mottled appearance.

As a post-compression step, the disks were dipped into a solution of the softening agent, and immediately removed and air-dried to produce a shiny, smooth exterior surface.

EXAMPLE 3

Extrusion Molded Picture Frames

To illustrate the extrusion molding potential of plastics produced in accordance with the present invention, an elongate extruded article such as a length of picture frame is produced using 3/16" particle size polystyrene and an aqueous MEK softening agent. A 4-foot long tube having an occluded distal end is packed with the particulate plastic and compressed using a piston under a pressure within the range of from about 20,000 psi to about 30,000 psi. The end of the piston is provided with an irregular surface to create a jagged end on the compressed product having a relatively large surface area and irregular lines on the compressed product.

The occlusion is removed from the distal end of the 4-foot tube, and the tube is simultaneously reloaded with particulate and softening agent. The piston is again introduced into the tube to compress the softened particulate, and back pressure for the compression is provided by a slight (e.g., few percent) reduction in the cross-sectional area near the distal end of the tube. Using a piston having a stroke of approximately 24 inches, approximately 15 inches column height of particulate material produces approximately 7-8 inches column height of solid material. Stroke frequency is approximately one stroke every 5 seconds, with particulate and softening agents simultaneously added during each up stroke of the piston. Solid product is extruded in 7-8 inch increments to produce a continuous product having a configuration complimentary to the configuration of the distal end of the compression tube.

Deviations from the process parameters disclosed herein are also likely to produce a useful plastic article, as will be apparent to one of skill in the art, depending upon the intended purpose to which the product is to be placed. Thus, the process parameters disclosed herein are merely illustrative of specific embodiments of the invention and are not intended to in any way limit the scope of the claims.

I claim:

1. A method of forming a solid, non-porous unitary plastic article from a plurality of plastic particles, comprising the steps of:
    introducing a plurality of plastic particles into a mold;
    contacting the plastic particles with a softening agent;
    applying sufficient pressure to the plastic particles to form a solid, non-porous unitary plastic article; and
    thereby forming a solid, non-porous unitary plastic article.

2. A method of forming a plastic article as in claim 1, wherein said plastic is selected from the group consisting of polystyrene, ABS, acrylic, polycarbonate and PVC.

3. A method of forming a plastic article as in claim 1, wherein said softening agent comprises an organic solvent selected from the group consisting of methylethylketone, acetone, toluene, xylene, and styrene monomer.

4. A method of forming a plastic article as in claim 3, wherein said softening agent further comprises water.

5. A method of forming a plastic article as in claim 3, wherein said softening agent further comprises an inert liquid miscible in said organic solvent.

6. A method of forming a plastic article as in claim 4, wherein said softening agent comprises water and methylethylketone.

7. A method of forming a plastic article as in claim 1, wherein said plastic particles comprise polystyrene and said softening agent comprises aqueous methylethylketone.

8. A method of forming a plastic article as in claim 1, wherein at least one component of said plastic particles have a screen size within the range of from about 1/32 inch to about ⅜ inch.

9. A method of forming a plastic article as in claim 7, wherein said particle size is about 3/16 inch.

10. A method of forming a plastic article as in claim 1, wherein said contacting step comprises introducing the softening agent into the mold to immerse the plastic particles.

11. A method of forming a plastic article as in claim 1, wherein said contacting step comprises spraying the plastic particles with the softening agent.

12. A method of forming a plastic article as in claim 1, wherein said pressure is in excess of about 2500 psi.

13. A method of forming a plastic article as in claim 12, where pressure is exerted for no more than about 4 seconds.

14. A method of forming a plastic article having a desired shape, comprising the steps of:
   providing a quantity of plastic particles;
   wetting the particles with a softening agent;
   compressing the plastic particles into said desired shape using sufficient pressure to form a solid, non-porous article; and thereby
   forming a solid, non-porous article.

15. A method of forming a plastic article as in claim 14, wherein said compressing step comprises compressing the plastic particles into a mold.

16. A method of forming a plastic article as in claim 14, wherein said compressing step comprises extruding the wetted plastic particles.

17. A method of forming a plastic article as in claim 14, wherein said plastic particles comprise polystyrene and said softening agent comprises methylethylketone.

18. A method of forming a plastic article as in claim 17, wherein said softening agent further comprises water.

19. A method of forming a plastic article as in claim 18, wherein said softening agent comprises within the range of from about 5% to about 35% methylethylketone and within the range of from about 95% to about 65% water.

20. A method of forming a plastic article as in claim 19, wherein said plastic particles have about a 3/16 inch particle size.

21. A method of forming a plastic article as in claim 1 or 14, further comprising the addition of a filler to the plastic particles.

22. A method of forming a plastic article as in claim 21, wherein said filler is selected from the group consisting of mica, talc, calcium carbonate, silica, glass fibers and graphite fibers.

23. A method of forming a plastic article as in claim 22, wherein said filler is present in an amount within the range of from about 1/10% to about 5% by weight of said plastic particles.

24. A method of forming a plastic article as in claims 1 or 14, further comprising the step of baking the formed article after it has been compressed.

25. A method of forming a plastic article as in claim 1, wherein said method further comprises, after contacting said plastic particles with said softening agent, draining said softening agent from said mold and then exposing the wetted plastic particles to a vacuum prior to applying pressure to said plastic particles.

26. A method of forming a plastic article as in claim 1, further comprising vibrating the plastic particles in the ultrasound or near ultrasound range prior to or during the compression of the particles.

27. A method of fusing two or more plastic particles comprising the steps of:
   contacting at least one fusing surface on at least one of said particles with a particle softening agent to produce a softened zone thereon;
   contacting at least two of said particles having at least one softened zone therebetween;
   compressing said particles together using sufficient pressure to form a solid, non-porous plastic article; and thereby
   forming a solid, non-porous plastic article.

28. The method of any of claims 1, 14, or 27, wherein a pressure of 10,000 psi or more is applied to said plastic particles.

29. The method of claim 28, wherein said plastic particles ar made from polystyrene.

30. The method of any of claims 1, 14, or 27, wherein said plastic particles are solid particles.

* * * * *

UNITED STATES PATENT AND TRADEMARK OFFICE
CERTIFICATE OF CORRECTION

PATENT NO. : 5,262,103
DATED : November 16, 1993
INVENTOR(S) : James P. LaPoint

It is certified that error appears in the above-indentified patent and that said Letters Patent is hereby corrected as shown below:

On the Title Page, Item [75]:

"James P. LaPoint,..." should read "J. Philip LaPoint,...; Davin A. LaPoint, Irvine Calif.";

This correction should also be reflected in the line directly below Item [19] which reads "LaPoint" should read "LaPoint et al."

Signed and Sealed this

Nineteenth Day of April, 1994

Attest:

BRUCE LEHMAN

Attesting Officer

*Commissioner of Patents and Trademarks*